US007512799B1

(12) United States Patent
Chow et al.

(10) Patent No.: US 7,512,799 B1
(45) Date of Patent: Mar. 31, 2009

(54) SYSTEM AND METHOD FOR ACCESSING A REMOTE SERVER FROM AN INTRANET WITH A SINGLE SIGN-ON

(75) Inventors: Chee-Seng Chow, San Jose, CA (US); James Sung, Fremont, CA (US); Jerome Tsung-Yao Chen, Fremont, CA (US); Fiyaz Sundarji, Los Altos, CA (US)

(73) Assignee: GETTHERE Inc., Menlo Park, CA (US)

( * ) Notice: Subject to any disclaimer, the term of this patent is extended or adjusted under 35 U.S.C. 154(b) by 1012 days.

(21) Appl. No.: 09/518,583

(22) Filed: Mar. 3, 2000
(Under 37 CFR 1.47)

Related U.S. Application Data (60) Provisional application No. 60/122,912, filed on Mar. 5, 1999.

(51) Int. Cl.
*H04L 9/32* (2006.01)
(52) U.S. Cl. .................................................. 713/172
(58) Field of Classification Search ............... 713/172, 713/201; 380/227–230, 21; 705/65–69; 709/229; 707/9; 726/6, 8
See application file for complete search history.

(56) References Cited

U.S. PATENT DOCUMENTS

| | | | | |
|---|---|---|---|---|
| 5,241,594 A | * | 8/1993 | Kung | 713/151 |
| 5,343,524 A | * | 8/1994 | Mu et al. | 705/55 |
| 5,661,807 A | * | 8/1997 | Guski et al. | 713/159 |
| 5,696,824 A | * | 12/1997 | Walsh | 705/75 |
| 6,144,959 A | * | 11/2000 | Anderson et al. | 707/9 |
| 6,236,981 B1 | * | 5/2001 | Hill | 705/67 |
| 6,360,254 B1 | * | 3/2002 | Linden et al. | 709/219 |
| 6,453,353 B1 | * | 9/2002 | Win et al. | 709/229 |
| 6,473,406 B1 | * | 10/2002 | Coile et al. | 370/248 |

OTHER PUBLICATIONS

Computer Dictionary, Sep. 1997, Microsoft Press, 3rd edition, p. 198-199.*

* cited by examiner

*Primary Examiner*—Ellen Tran
(74) *Attorney, Agent, or Firm*—Alston & Bird LLP (57) ABSTRACT

A system and method for performing multiple user authentications with a single sign-on is disclosed. This system and method begins when the user performs a first user authentication, with user name and password, within the user's Intranet. Then the user selects a remote server subsequent to the first authentication. The server in the Intranet sends a token to the remote server containing authentication information made available because of the first authentication. Finally, the remote server decodes the authentication information, which has the effect within the remote server of performing a second user authentication without the user needing to sign-on a second time.

20 Claims, 9 Drawing Sheets

SYSTEM AND METHOD FOR ACCESSING A REMOTE SERVER FROM AN INTRANET WITH A SINGLE SIGN-ON

CROSS-REFERENCE TO RELATED APPLICATIONS

This application is related to and claims the benefit of the filing date of U.S. Provisional Patent Application No. 60/122,912, filing date Mar. 5, 1999, entitled "Unified Single Sign On".

FIELD OF THE INVENTION

The present invention relates to wide area networking, and, more specifically, to accessing a remote server from an Intranet utilizing a single sign-on authentication.

BACKGROUND

In order to be able to access various computer resources, such as the Internet, a private network such as an Intranet, or other similar resources, a user must authenticate his right to access the resource through a process variously called a "log-on" or a "sign-on". A typical process includes submitting an agreed upon name called a "username" and a password. Usually the submission is performed by the user typing in his username and password on an electronic form supplied by the resource.

Many companies have created private networks that mimic the activity of the Internet. These private networks, called Intranets, allow authorized users access to data which the company wishes to keep private. A software structure called a firewall allows a one-way access from an Intranet to the Internet. The firewall allows authorized users of that Intranet to access data from the Internet without allowing external persons on the Internet to access the private Intranet data.

In order to access these Intranets, authorized users sign-on with a username and a password. However, these same users may then wish to access remote servers on the Internet. These remote servers may require their own sign-on authentication for the user.

Each particular user may have a different username for the sign-on for the remote server than for the Intranet. Furthermore, for the sake of maximum security, a different password should be used. However, what has been noticed in practice is that the requirement for multiple usernames and passwords often produces non-secure behavior in many users. They may either use the same password in both situations, or them may use trivial passwords (e.g. "password"). Other forms of non-secure behavior may include writing down the usernames and passwords, and posting these on a user's computer workstation.

SUMMARY OF THE INVENTION

A system and method for performing multiple user authentications with a single sign-on is disclosed. In one exemplary embodiment, the system and method starts when the user performs a first user authentication, with user name and password, within the user's Intranet. Then the user selects a remote server subsequent to the first authentication. The server in the Intranet sends a token to the remote server containing authentication information made available because of the first authentication. Finally, the remote server decodes the authentication information, which has the effect within the remote server of performing a second user authentication without the user needing to sign-on a second time.

BRIEF DESCRIPTION OF THE DRAWINGS

The present invention is illustrated by way of example, and not by way of limitation, in the figures of the accompanying drawings.

DETAILED DESCRIPTION

A system and method for performing multiple user authentications with a single sign-on is disclosed. In one embodiment, the system and method starts when the user performs a first user authentication, with user name and password, within the user's Intranet. Then the user selects a remote server subsequent to the first authentication. The server in the Intranet sends a token to the remote server containing authentication information made available because of the first authentication. Finally, the remote server decodes the authentication information, which has the effect within the remote server of performing a second user authentication without the user needing to sign-on a second time.

Figure 1:
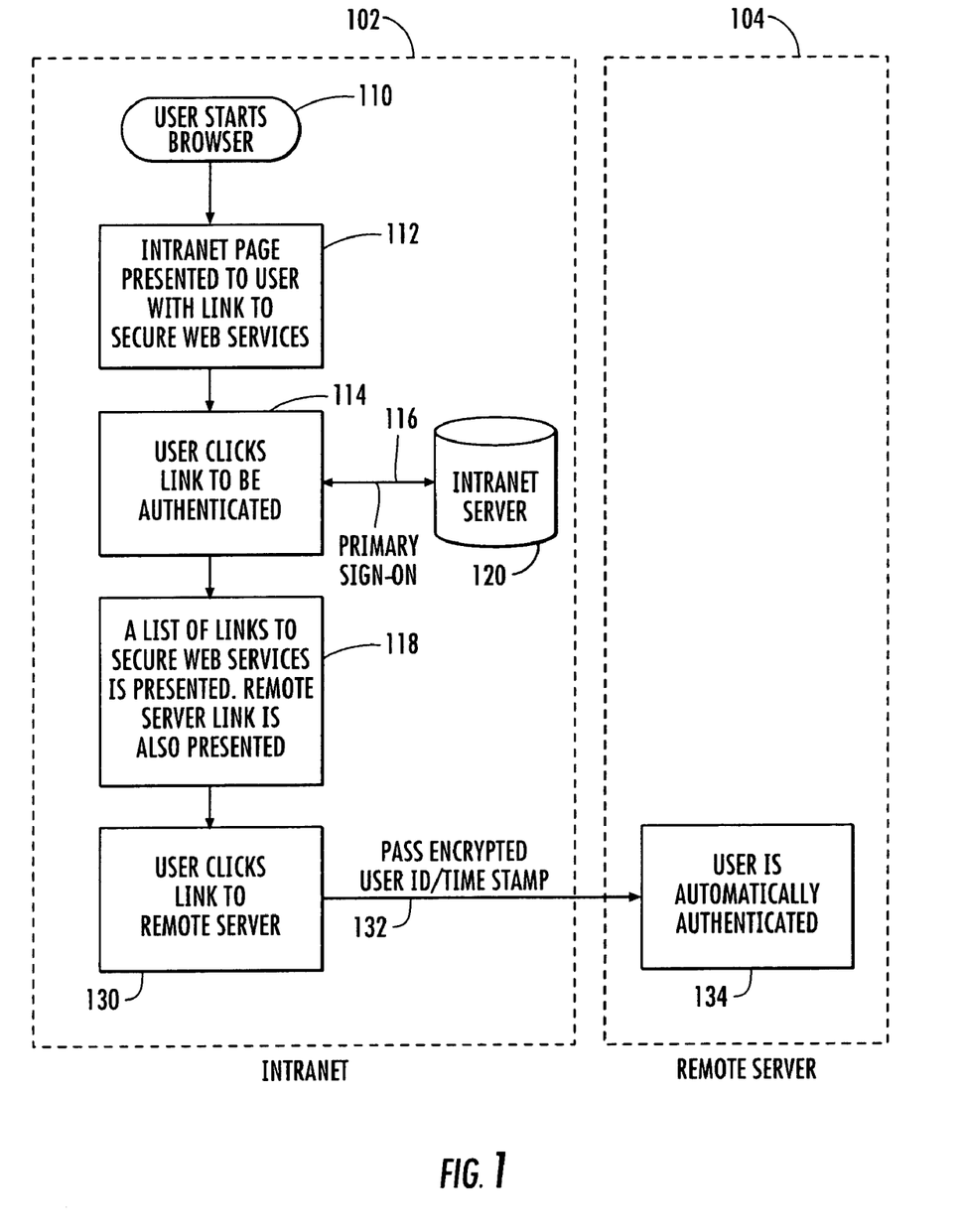
FIG. 1 is a block diagram of a method for accessing a remote server with a single sign-on authentication, according to one embodiment of the present invention.

Referring now to FIG. 1, a block diagram of a method for accessing a remote server with a single sign-on authentication is shown, according to one embodiment of the present invention. FIG. 1 illustrates an Intranet 102 and a remote server 104. In the FIG. 1 embodiment, an Intranet server 120 is shown. This Intranet server 120 may be the server for the internal Intranet of a company. In other embodiments, the functionality of Intranet server 120 may be distributed among several pieces of equipment within Intranet 102.

Intranet 102 may be connected to remote server 104 via the Internet or via another wide area network (WAN). In one exemplary embodiment, remote server 104 may host a travel reservation and booking service. In other embodiments, Intranet 102 may be connected directly to remote server 104 via a local area network (LAN) or by another kind of computer interface.

It should be noted that remote server 104 is logically remote and not necessarily geographically remote. Remote server 104 may be in the same building as Intranet 102, and may even be connected to Intranet 102 by a direct connection such as a LAN. Being logically remote may merely indicate that remote server 104 may not be immediately accessed by a user connected to Intranet 102 due to sign-on requirements of remote server 104.

In order that a user may become authorized to access an application within remote server 104, the user may first start their browser, at step 110. The Intranet server 120 may then present a sign-on page to the user, at step 112. The user may then click a link on this sign-on page to enter the primary sign-on sequence 116 with Intranet server 120. This primary sign-on sequence 116 may take the form of a forms-driven dialog that prompts the user for the username, password, and, potentially, other forms of identifying data.

In other embodiments, the process of signing-on to the Intranet 102 may be performed by different actions than those shown in steps 110, 112, 114, and 116. In alternate embodiments, the user access to the Intranet may be authorized by other mean, or the user access to the Intranet may be automatically authorized. In one alternate embodiment, a user may sign-on when powering-on their workstation. Once signed on to their workstation, they are automatically authenticated to the Intranet. Each of these alternate embodiments may serve as a primary sign-on sequence of the present invention.

Once a primary sign-on sequence 116 is completed, the user may be presented with the ability to use the resources of the Intranet, and resources external to the Intranet. In one embodiment, a list of links to click on are presented to the user on the user's browser 118. In this embodiment, a link to the remote server is also present.

If the user clicks the link for the remote server 130, then, because the Intranet server 120 has already authenticated the user in the primary sign-on sequence 116, the Intranet server 120 sends information to the remote server 104 which causes the remote server 104 to authenticate the user without the user needing to perform a second sign-on sequence. In one embodiment, the Intranet server 120 sends an encrypted user identification (user ID) and time stamp to the remote server 104. The remote server 104 may decode the user ID and time stamp, and based only upon these items authenticate the user without the need for the user to perform a secondary sign-on sequence 134.

After this authentication is complete, the remote server 104 gives access to the user. In one embodiment, the remote server 104 presents a menu page to the user. This menu page enables the user to access desired functions available through the remote server 104.

It should be noted that the order of certain of the authentication steps shown in FIG. 1 is not critical to the present invention. In alternate embodiments, certain steps analogous to the steps 110, 112, 114, 116, 118, and 130 may occur in differing order. In certain embodiments, one or more analogous steps may not be present at all.

Figure 2A:
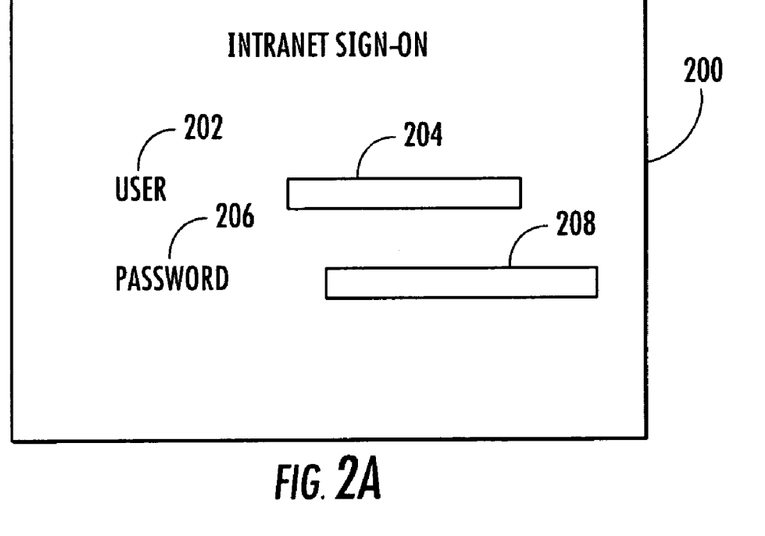
FIG. 2A is an exemplary screen of a user sign-on interface, according to one embodiment of the present invention.

Referring now to FIG. 2A, an exemplary screen of user sign-on interface is shown, according to one embodiment of the present invention. The FIG. 2A screen may be an Intranet sign-on page 200 for use in the primary sign-on sequence 116 of FIG. 1. In other embodiments, other techniques may be used for authenticating a user for access to an Intranet.

Intranet sign-on page 200 may include a user prompt 202 with associated username entry field 204. In one embodiment, the user selects the username entry field 204 and types the username. Intranet sign-on page 200 may also include a password prompt 206 with associated password entry field 208. In one embodiment, the user selects the password entry field 208 and types the password. In alternate embodiments, other kinds of user information may be gathered for the purpose of authentication, including alternate kinds of text, voice entry, or other physical evidence (e.g. fingerprint or retina matching). In each case the Intranet server 120 may provide user authentication subsequent to a action taken by the user.

Figure 2B:
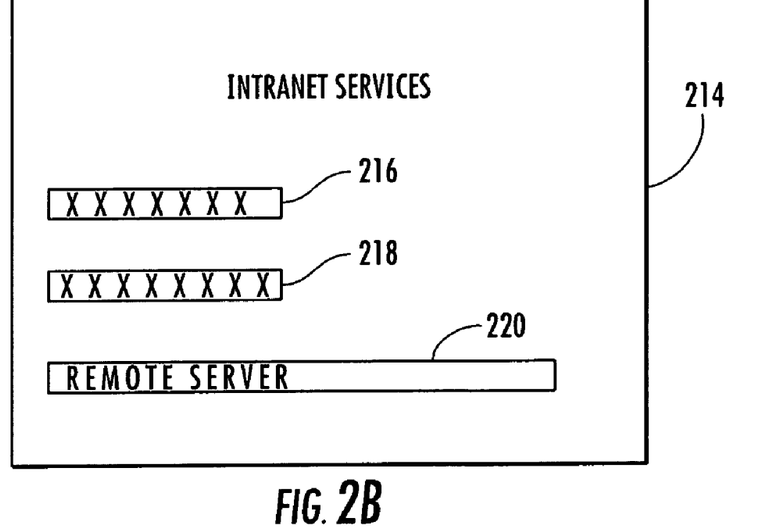
FIG. 2B is an exemplary screen of a user access link to a remote server, according to one embodiment of the present invention.

Referring now to FIG. 2B, an exemplary screen of a user access link to a remote server is shown, according to one embodiment of the present invention. The Intranet services page 214 of FIG. 2B may be presented to the user to allow the user to access certain features and functions of the Intranet subsequent to a successfully completed sign-on sequence. Intranet services page 214 may include links to Intranet services 216, 218, which, when selected by the user, may cause subsequent features and functions specific to the Intranet to be presented to the user. Links to Intranet services 216, 218 may be to services such as user spending accounts, the company's proprietary technical database, or any other services provided by the particular Intranet.

Intranet services page 214 may also include a link to remote server 220. In one embodiment, the user selects this link to remote server 220 by clicking on it. This act causes a subsequent page to be displayed to the user to allow the user to access features and functions of the remote server. In alternate embodiments, other dialogs between the user and remote server are used. In each case the user need not provide authentication information as part of a secondary sign-on sequence.

Figure 3:
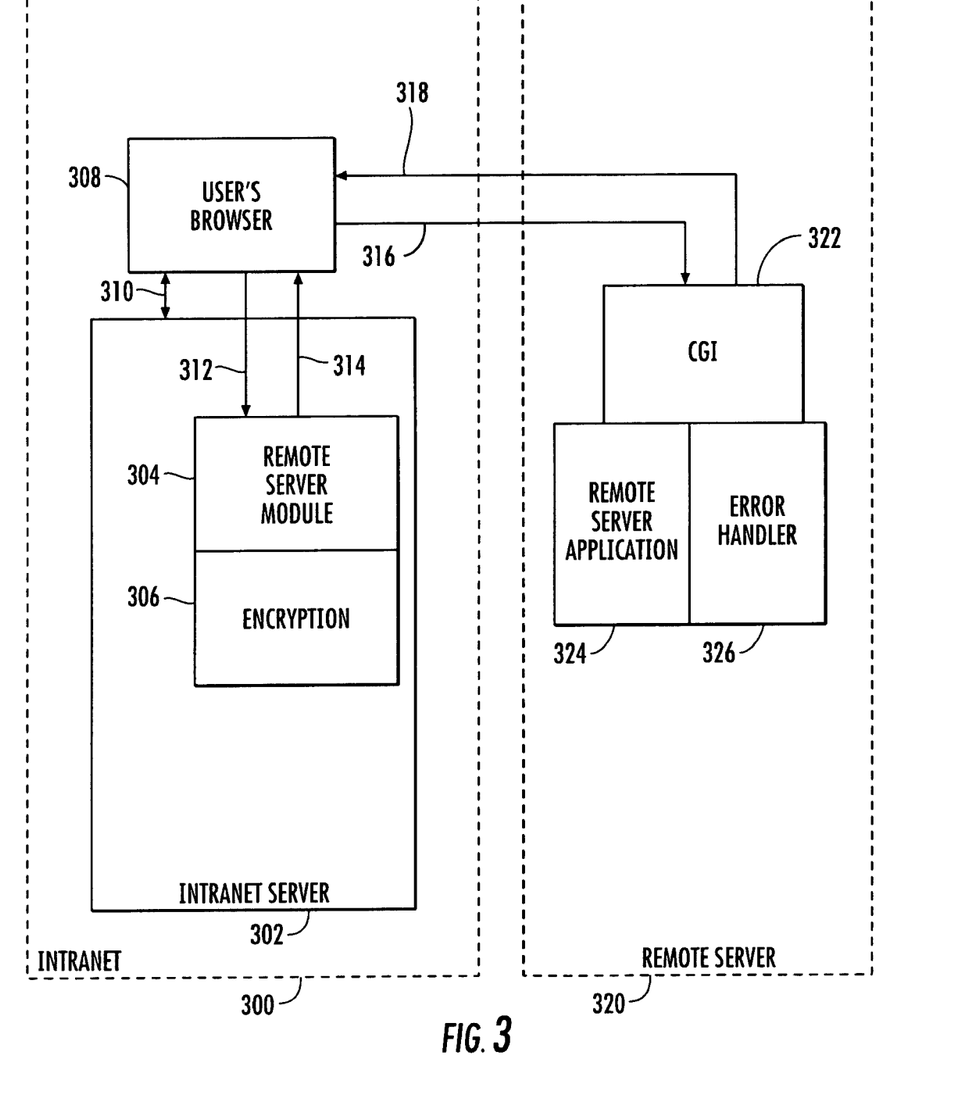
FIG. 3 is a diagram illustrating software module location within hardware configuration items, according to one embodiment of the present invention.

Referring now to FIG. 3, a diagram illustrating software module location within hardware configuration items is shown, according to one embodiment of the present invention. Intranet 300 may include a user's browser 308 and Intranet server code 302. In one embodiment, the user's browser 308 and Intranet server code 302 are hosted by separate processors. In this embodiment, user's browser 308 and Intranet server code 302 may exchange information over a user data path 310. In alternate embodiments, user's browser 308 and Intranet server code 302 may be executed upon a shared processor or processors.

In one embodiment, Intranet services code 302 may include a remote server module 304 and an encryption module 306. In one embodiment, remote server module 304 may be a common gateway interface (CGI) module or a server plug-in module. In alternate embodiments, remote server module 304 may utilize other forms of interface code architecture. The remote server module 304 may be activated by a remote link request 312. When activated, remote server module 304 may examine the status of the user's authentication for access to the Intranet. If the user is authenticated for access to the Intranet, then remote server module 314 may respond to remote link request 312 by providing a uniform resource locator (URL) with encrypted token 314 to the user's browser for use in accessing remote server code 320.

Remote server module 314 may make use of encryption module 306 in the preparation of the URL with encrypted token 314. Encryption module 306 may use the data encryption standard (DES), with keys of various lengths. In one embodiment, encryption module 306 may use the 128 bit long keys for users within the United States, and keys with fewer bits (e.g. 56 bits) for users outside the United States. In one embodiment, triple DES in cipher block chaining (CBC) mode may be used, with two keys. In CBC mode, the token is encrypted with the first key, decrypted with the second key, and then re-encrypted with the first key. Data from one 64 bit long block may be used to seed the initialization vector of the subsequent block.

An example URL with encrypted token 314 may be as follows:

http://www.remoteserver.com/cgi/xreg/remoteserver/corp/abcorp?message_version=1&auth_message={encrypted token}&err_url={Error URL}&fwd_cnt=1.

Once the user's browser 308 has the URL with encrypted token 314, the user's browser 308 may transmit the URL with encrypted token 314 to the remote server code 320 along a transmitted URL data path 316. Remote server code 320 may include a CGI module 322, a remote server application 324, and an error handler 326. In one embodiment, CGI module 322 receives the URL with encrypted token from the transmitted URL data path 316. CGI module 322 may then decode the URL and decrypt the encrypted token. In one embodiment, CGI module 322 passes the decrypted token to remote server application 324 for authentication of the user. In other embodiments, the CGI module 322 may perform the authentication of the user.

In alternate embodiments, remote server code 320 may utilize alternate interface code architectures than the CGI shown in the FIG. 3 embodiment.

If, based upon the contents of the decrypted token, the remote server application 324 authenticates the user, then a welcoming page 318 is sent to the user's browser. This welcoming page indicates to the user that the user has been authenticated by the remote server code 320. Once the user has been authenticated, the welcoming page may be used by the user to access features and functions of the remote server application 324.

If, based upon the contents of the decrypted token, the remote server application 324 cannot authenticate the user, then the error handler 326 may prepare an error message for transmitting to the user's browser.

Figure 4:
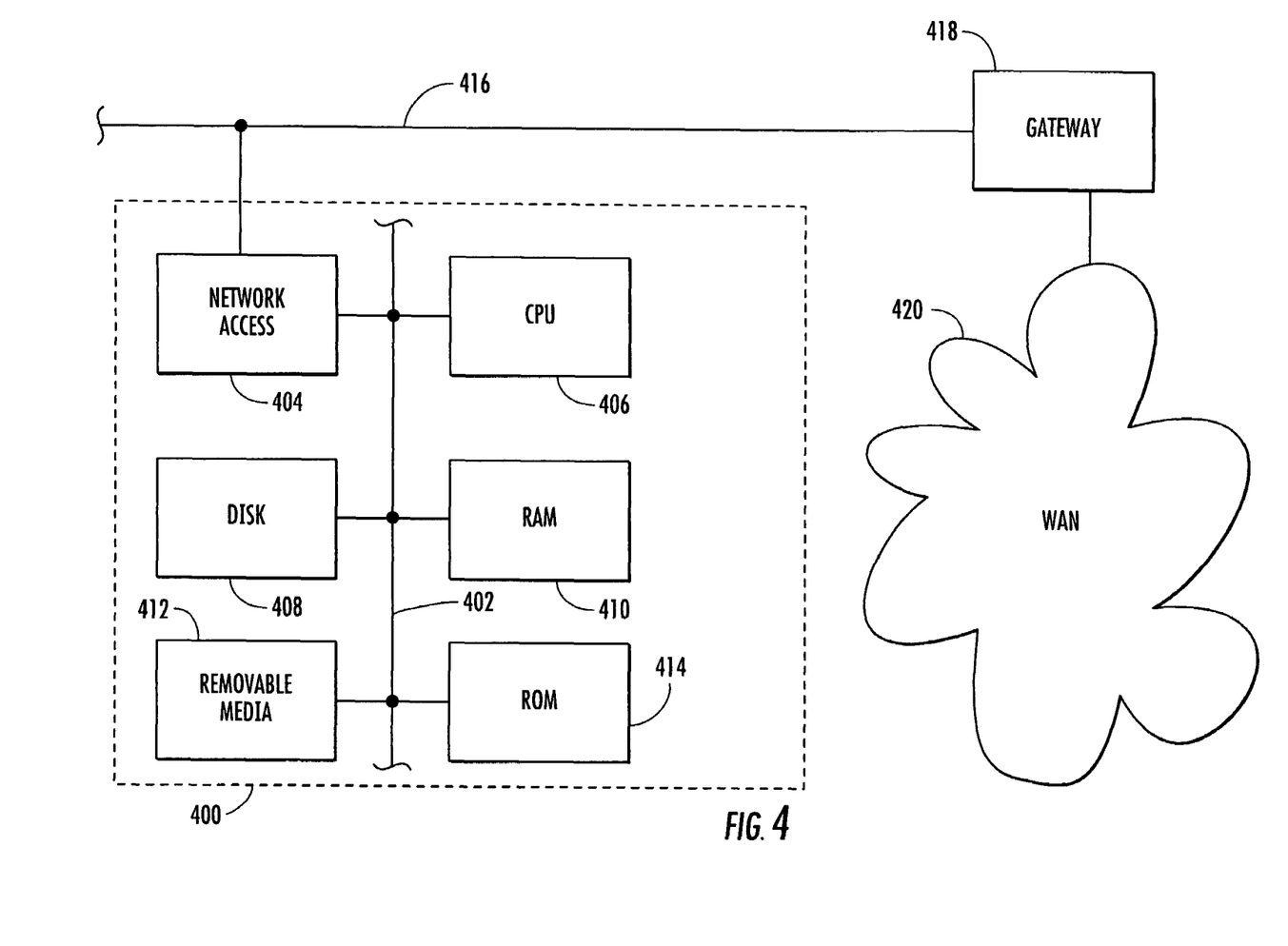
FIG. 4 is a block diagram of the Intranet server, according to one embodiment of the present invention.

Referring now to FIG. 4, a block diagram of the Intranet server 400 is shown, according to one embodiment of the present invention. Intranet server 400 may include a server bus 402, a network access circuit 404, a central processing unit (CPU) 406, disk 408, random access memory (RAM) 410, removable media 412, and read only memory (ROM) 414.

In one embodiment, Intranet server code 302 of FIG. 3 may be executed by CPU 406 and may be stored on disk 408. Disk 408 may be magnetic, optical, or magneto-optical. Portions of Intranet server code 302 may be loaded or removed from Intranet server 400 by using removable media 412. Removable media 412 may be a floppy disk, magnetic tape, optical media (e.g. compact disc read only memory (CD-ROM), digital versatile disc (DVD), write once read many (WORM)), flash memory, or any other removable data storage media.

Intranet server 400 may be connected to a wide area network (WAN) 420. In one embodiment, WAN 420 is the Internet. In alternate embodiments, other kinds of WAN may be used. In one embodiment, Intranet server 400 may be connected to WAN 420 via a local area network (LAN) 416 and a gateway 418. Intranet server 400 may use a network access circuit 404 to connect with LAN 416. In other embodiments, Intranet server 400 may connect to WAN 420 via other forms of connections, or may be directly connected to WAN 420.

For the purpose of security within the Intranet, Intranet server 400 may use a security software module called a firewall. The firewall may be contained within Intranet server 400 or may be executed by gateway 418.

Figure 5:
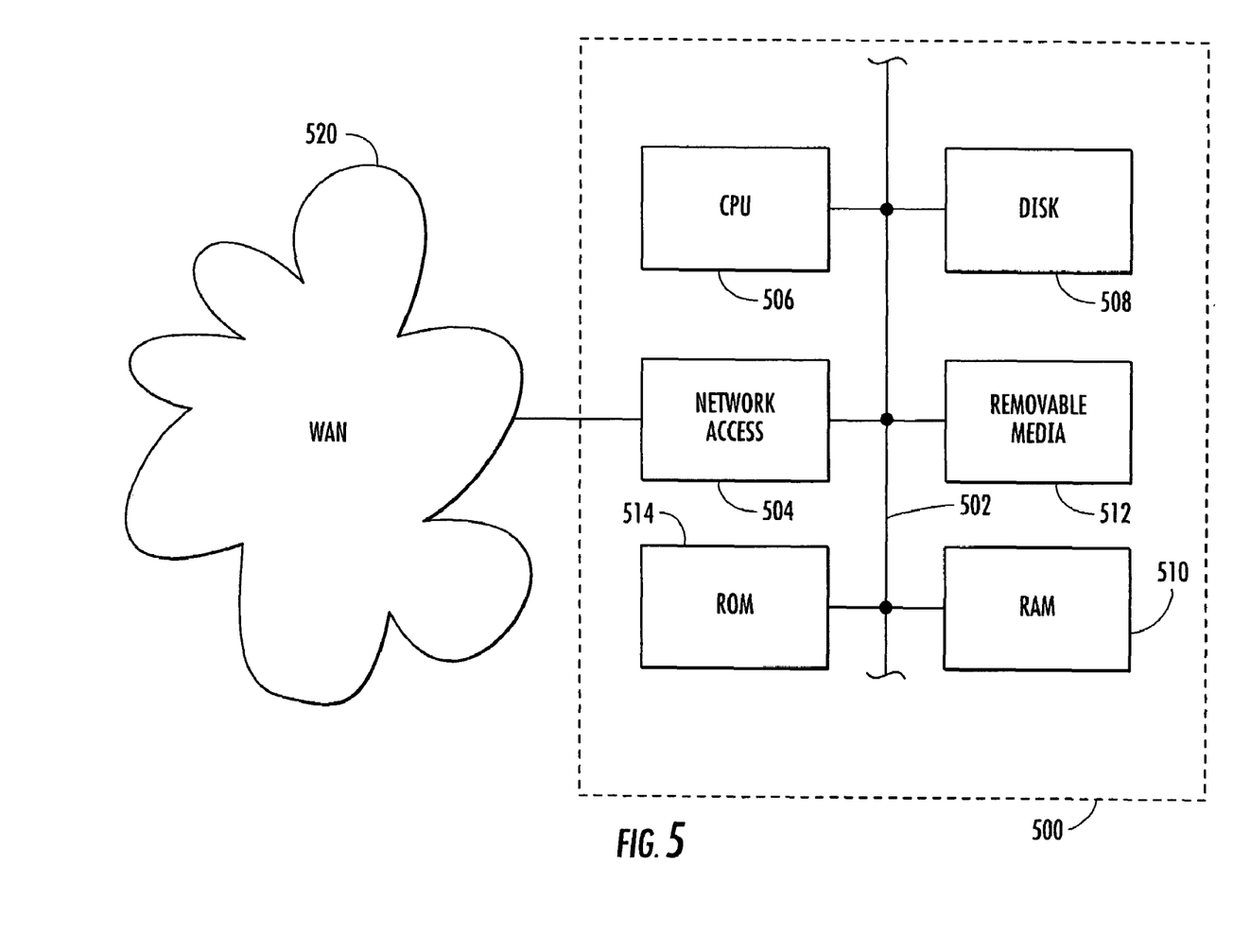
FIG. 5 is a block diagram of the remote server, according to one embodiment of the present invention.

Referring now to FIG. 5, a block diagram of the remote server 500 is shown, according to one embodiment of the present invention. Remote server 500 may include a server bus 502, a network access circuit 504, a CPU 506, disk 508, RAM 510, removable media 512, and ROM 514.

In one embodiment, remote server code 320 of FIG. 3 may be executed by CPU 506 and may be stored on disk 508. Disk 508 may be magnetic, optical, or magneto-optical. Portions of remote server code 320 may be loaded or removed from remote server 500 by using removable media 512. Removable media 512 may be a floppy disk, magnetic tape, optical media (e.g. CD-ROM, DVD, or WORM), flash memory, or any other removable data storage media.

Remote server 500 may be connected to a WAN 520. In one embodiment, WAN 520 is the Internet. In alternate embodiments, other kinds of WAN may be used. In one embodiment, remote server 500 may be connected to WAN 520 via a network access circuit 504. In other embodiments, remote server 500 may connect to WAN 520 via other forms of connections.

Figure 6:
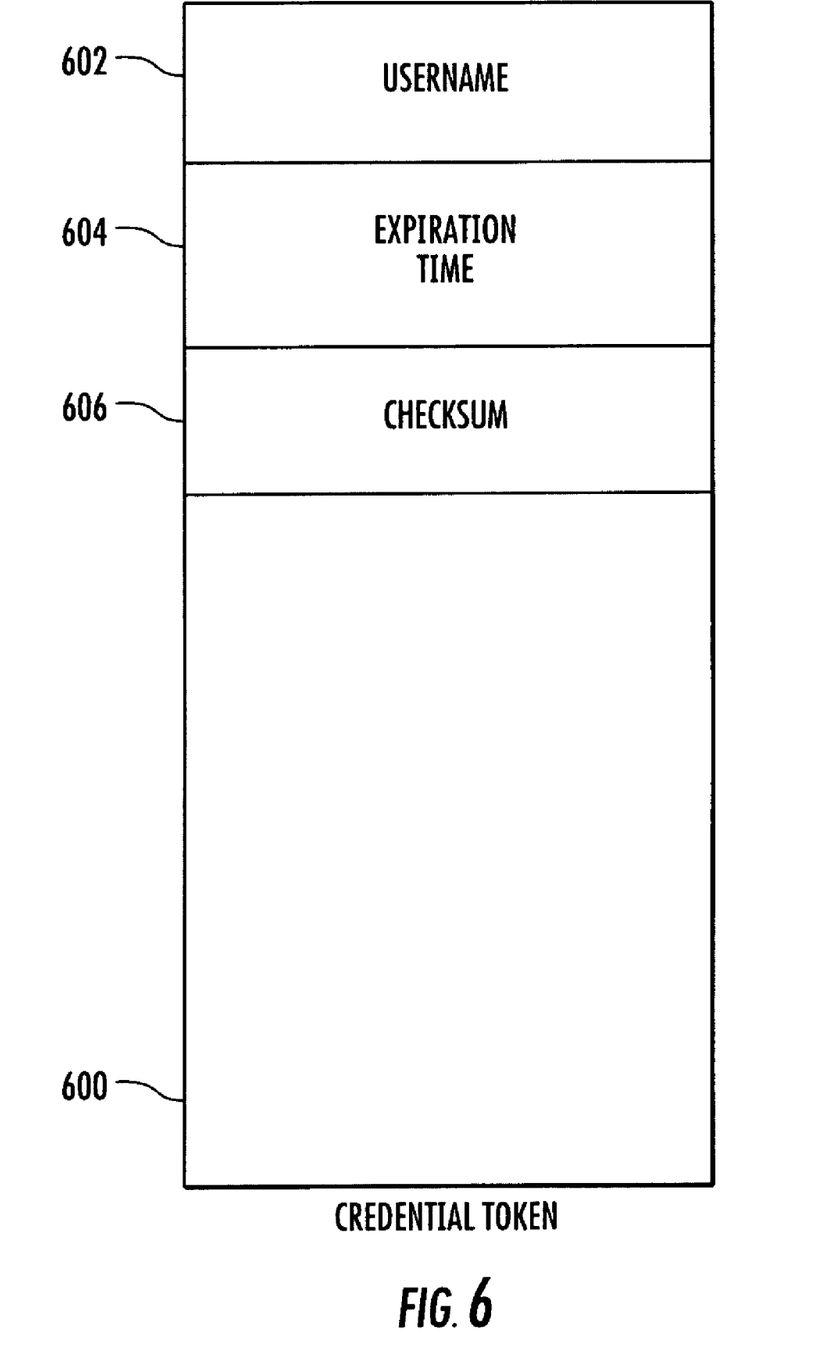
FIG. 6 is table showing contents of an authentication token, according to one embodiment of the present invention.

Referring now to FIG. 6, a table shows the contents of an authentication token, according to one embodiment of the present invention. In the FIG. 6 embodiment, the authentication token takes the form of credential token 600. Credential token 600 may include a username 602, an expiration time 604, and checksum 606. Credential token 600 may be encrypted by the Intranet server and placed into a URL for transmission to and subsequent user authentication by the remote server. Username 602 may be any form of agreed-upon name for the user.

Credential token 600 is intended to be encrypted and placed within a URL for transmitting to the remote server. The remote server may authenticate the user based only upon the contents of the URL. A user could circumvent the security access features of the remote server by bookmarking or otherwise remembering the URL. Such a bookmark would allow unauthorized persons access to the remote server. Therefore, credential token 600 includes an expiration time 604. In one embodiment, expiration time 604 may be the current time within the Intranet server when the credential token 600 is created. Expiration time 604 may be in Unix 32 bit long Unix time code (UTC) format. Synchronization of the time clocks within the Intranet and the remote server may be performed by network time protocol (NTP).

In alternate embodiments, the expiration time 604 contains a representation of some time subsequent to the time of URL generation after which the remote server will no longer accept the URL for the purpose of user authentication. This expiration time 604 may be chosen to be the current time of credential token 600 creation, as indicated by the time clock of the Intranet, plus an additional period of time to allow for the estimated transmission time over the Internet. The expiration time 604 may have added to it an additional time period so that the time standards of the Intranet and of the remote server need not be closely synchronized.

The checksum 606 may be as calculated by one of various cyclic redundancy check (CRC) algorithms, or by any other agreed-upon algorithm. In one embodiment, checksum 606 may be calculated using CRC-32. Checksum 606 may give an indication of data integrity when credential token 600 is examined by the remote server. The results of the remote server examining the credential token 600 may be used to permit or deny user authentication.

Figure 7:
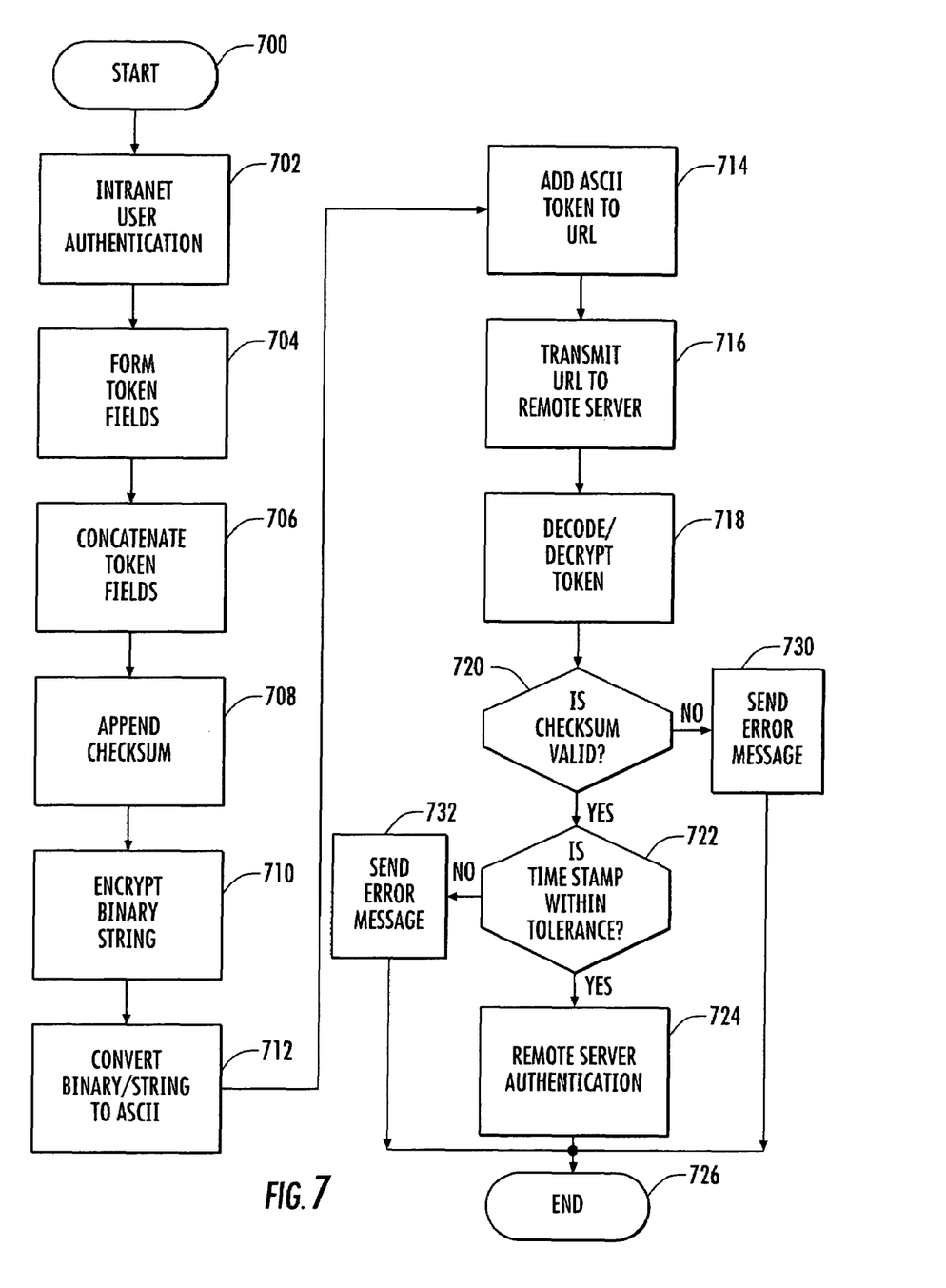
FIG. 7 is a flowchart of the authentication method, according to one embodiment of the present invention.

Referring now to FIG. 7, a flowchart of the authentication method is shown, according to one embodiment of the present invention. The user starts 700 the process by performing an Intranet user authentication 702. When the user selects a link to gain access to the remote server, the Intranet server first forms the necessary token fields, at step 704. These token fields may include the username 602 and expiration time 604 of FIG. 6. Then, at step 706, the token fields are concatenated to form a single binary string.

At step 708, a checksum is calculated for the single binary string created in step 706, and the checksum is appended to the binary string. Then, in step 710, the binary string is encrypted. In order that the encrypted binary string may be inserted into a URL, at step 712 the encrypted binary string is converted to American standard code for information interchange (ASCII) format. The result of step 712 is an encrypted token consisting of ASCII characters.

At step 714, the Intranet server places the encrypted ASCII token into a URL. Then, in step 716, the URL containing the encrypted ASCII token is transmitted to the remote server.

The remote server receives the URL and extracts the encrypted ASCII token. In step 718, the remote server reverses the process of steps 710 and 712. In decision step 720, the remote server tests the validity of the received checksum. If the checksum is not valid, then, in step 730, an error message is generated and the user is not authenticated.

If the checksum is valid, then, in decision step 722, the timestamp (expiration time field) is examined. If the indicated time of the timestamp is not within a selected tolerance of the time on the time clock of the remote server, then, in step 732, an error message is sent, and the user is not authenticated. If the indicated time of the timestamp is within a selected tolerance, then, in step 724, the remote server authenticates the user and issues a welcoming page. In one embodiment, the selected tolerance is between 15 and 25 minutes.

Figure 8:
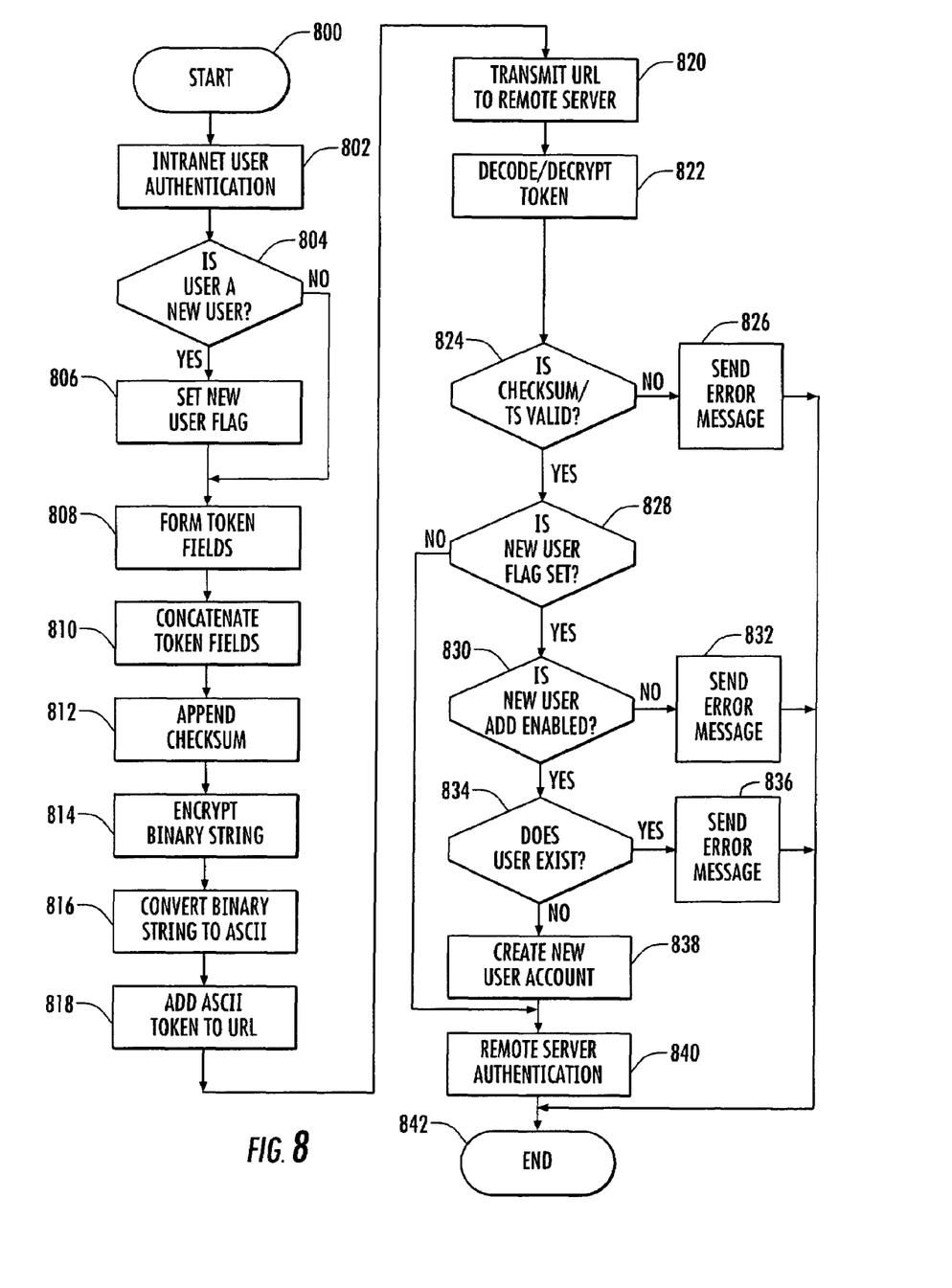
FIG. 8 is a flowchart of a method for adding a new user, according to one embodiment of the present invention.

Referring now to FIG. 8, a flowchart of a method for adding a new user is shown, according to one embodiment of the present invention. The FIG. 7 process assumed that the username corresponded to an existing, valid user of the remote server. The FIG. 8 embodiment adds the capability to add new user accounts to the remote server.

In step 802, the user performs an Intranet user authentication. In decision step 804, the Intranet server determines whether the user is a new user. If not, then the process proceeds to step 808. If, however, the user is a new user, in step 806 the Intranet server sets a new user flag.

In alternate embodiments, the Intranet server may not make any determination whether the user is a new user, and may not take any action with regards the new or existing status of the user.

In step 808 the Intranet server forms the fields for the token, including the new user flag. Then, at step 810, the token fields are concatenated to form a single binary string.

At step 812, a checksum is calculated for the single binary string created in step 810, and the checksum is appended to the binary string. Then, in step 814, the binary string is encrypted. In order that the encrypted binary string may be inserted into a URL, at step 816 the encrypted binary string is converted to ASCII format. The result of step 816 is an encrypted token consisting of ASCII characters.

At step 818, the Intranet server places the encrypted ASCII token into a URL. Then, at step 820, the URL containing the encrypted ASCII token is transmitted to the remote server.

In step 822, the remote server receives and decrypts the token. In decision step 824, the remote server determines whether the checksum is valid and whether the timestamp is within tolerance. If not, then in step 826 an error message is generated and the user is not authenticated.

If, in step 824, the checksum is valid and the timestamp is within tolerance, then, in step 828, the new user flag status is tested. If the new user flag is not set, then the process proceeds to step 840, and the user is authenticated. However, if the new user flag is set, then the process proceeds to decision step 830.

In alternate embodiments, there may be no new user flag, and the remote server software may automatically treat all unknown users as new users. In this alternate embodiment, once the user's authentication credentials are established by a step analogous to step 824 of FIG. 8, the remote server software may automatically create a new user account for all unknown users.

If, in step 830, the remote server software is not set to enable adding new users, then, in step 832, an error message is generated and the user is not authenticated. However, if, in step 830, the remote server software is set to enable adding new user, then, in step 834, the remote server tests to see if the username is already in use. If so, then, in step 836, an error message is sent and the user is not authenticated. If, however, in step 834, the username is determined to not be in prior use, then, in step 838, a new user account is established, and, in step 840, the user is authenticated.

Figure 9:
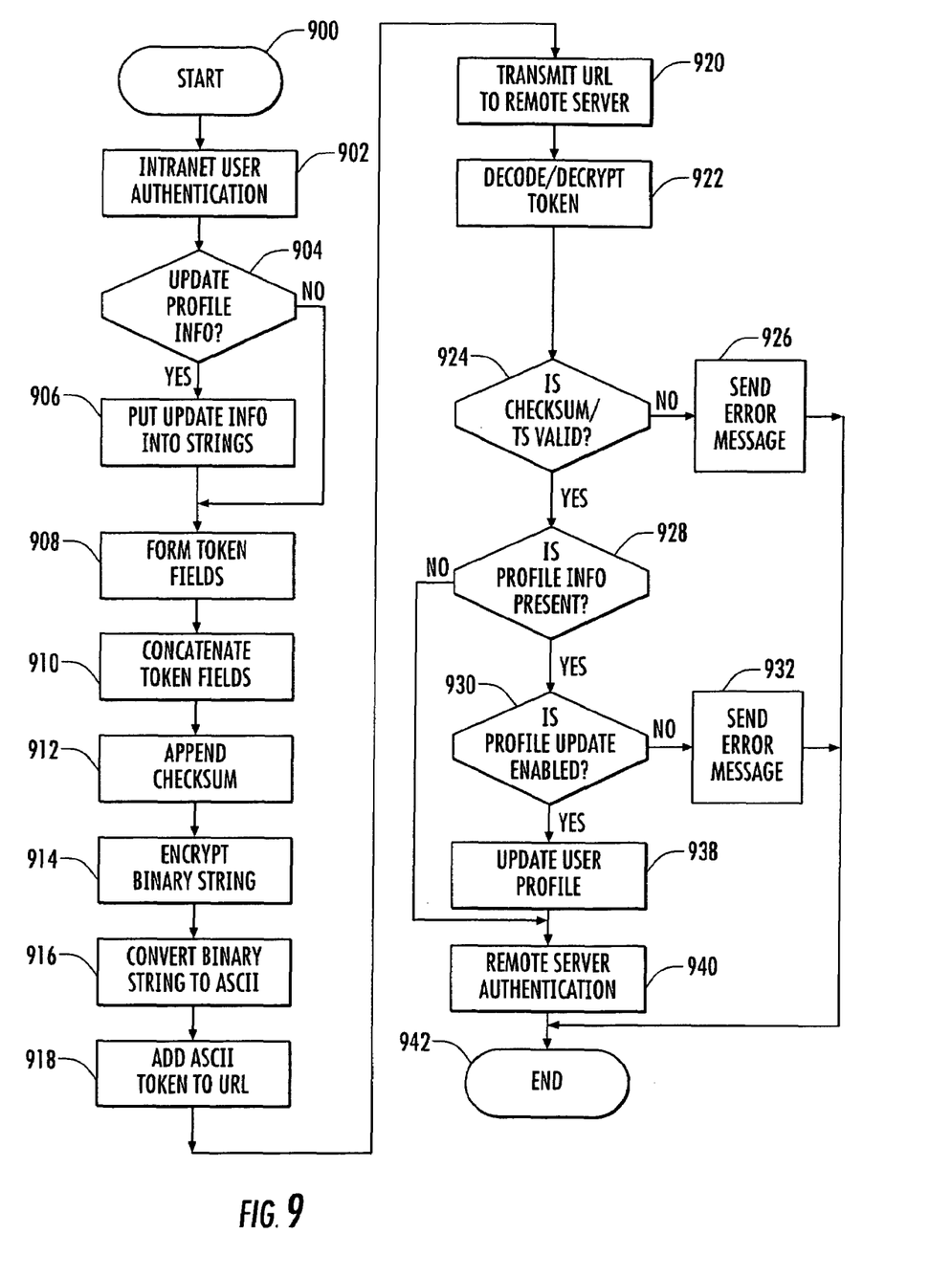
FIG. 9 is a flowchart of a method for updating a user's profile, according to one embodiment of the present invention.

Referring now to FIG. 9, a flowchart of a method for updating a user's profile is shown, according to one embodiment of the present invention. User profile information may be stored by the remote server. The user profile information may include information about the user that may help the remote server provide efficient service to the user. In one embodiment, the remote server may be a travel reservation and booking service. In this embodiment, user profile information may include dietary choices, seating preferences, travel spending limits, and other information specific to a given user.

The FIG. 7 process assumed that the user profile information could only be edited on the remote server. The FIG. 9 embodiment adds the capability to transmit new or updated user profile information to the remote server.

In step 902, the user performs an Intranet user authentication. In decision step 904, the Intranet server determines if the user wishes to create a new user profile or update an existing user profile. If not, then the process proceeds to step 908. If, however, the user creates a new user profile or updates an existing user profile, in step 906 the Intranet server places this user profile data into strings.

In step 908, the Intranet server forms the fields for the token, including the new user profile data. Then, at step 910, the token fields are concatenated to form a single binary string.

At step 912, a checksum is calculated for the single binary string created in step 910, and the checksum is appended to the binary string. Then, in step 914, the binary string is encrypted. In order that the encrypted binary string may be inserted into a URL, at step 916 the encrypted binary string is converted to ASCII format. The result of step 916 is an encrypted token consisting of ASCII characters.

At step 918 the Intranet server places the encrypted ASCII token into a URL. Then, at step 920, the URL containing the encrypted ASCII token is transmitted to the remote server.

In step 922, the remote server receives and decrypts the token. In decision step 924, the remote server determines whether the checksum is valid and whether the timestamp is within tolerance. If not, then, in step 926, an error message is generated and the user is not authenticated.

If, in step 924, the checksum is valid and the timestamp is within tolerance, then, in step 928, the token is examined for user profile information. If there is no user profile information present within the token, then the process proceeds to step 940, and the user is authenticated at step 940. However, if user profile information is found, then the process proceeds to decision step 930.

If, in step 930, the remote server software is not set to enable updating user profile information, then, in step 932, an error message is generated and the user is not authenticated. However, if, in step 930, the remote server software is set to enable updating user profile information, then, in step 938, the remote server creates a new user profile or updates any existing user profile. Then, in step 940, the user is authenticated.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of performing multiple user authentications with a single sign-on, comprising: performing a first user authentication; selecting a remote server subsequent to said first authentication; sending a token to said remote server containing authentication information responsive to said first authentication, wherein the token also contains information regarding an account for the user including a new account for the user and wherein the information regarding an account for the user in said token includes a new user flag; and decoding said authentication information, wherein said decoding said authentication information induces a second user authentication.

2. The method of claim 1, wherein said sending includes sending said token within a universal resource locator.

3. The method of claim 2, wherein said token includes a timestamp.

4. The method of claim 2, wherein said token is encrypted.

5. The method of claim 1, wherein said remote server creates a new user account in response to said new user flag.

6. The method of claim 1, wherein the information regarding an account for the user in said token includes user profile update information.

7. The method of claim 6, wherein said remote server updates a user profile in response to said user profile update information.

8. The method of claim 1, wherein said first user authentication occurs within an Intranet.

9. The method of claim 1, wherein said second user authentication occurs within said remote server.

10. A system for performing multiple user authentications with a single sign-on, comprising: a user sign-on interface, configured to perform a first user authentication; a link interface, configured to select a remote server subsequent to said first user authentication; a token configured to be sent to said remote server, said token containing authentication information responsive to said first user authentication and information regarding an account for the user including a new account for the user and wherein the information regarding an account for the user in said token includes a new user flag; and a decoder configured to decode said authentication information, said decoder further configured to induce a second user authentication.

11. The system of claim 10, wherein said token is coupled to a uniform resource locator.

12. The system of claim 11, wherein said token includes a timestamp.

13. The system of claim 11, wherein said token is encrypted.

14. The system of claim 10, wherein said remote server creates a new user account in response to said new user flag.

15. The system of claim 10, wherein the information regarding an account for the user in said token includes user profile update information.

16. The system of claim 15, wherein said remote server updates a user profile in response to said user profile update information.

17. The system of claim 10, wherein said first user authentication occurs within an Intranet.

18. The system of claim 10, wherein said second user authentication occurs within said remote server.

19. A system for performing multiple user authentications with a single sign-on, comprising:
   means for performing a first user authentication;
   means for selecting a remote server subsequent to said first authentication;
   means for sending a token to said remote server containing authentication information responsive to said first authentication and information regarding an account for the user including a new account for the user and wherein the information regarding an account for the user in said token includes a new user flag; and
   means for decoding said authentication information, wherein said means for decoding said authentication information induces a second user authentication.

20. A tangible machine-readable medium having stored thereon instructions for performing multiple user authentications with a single sign-on, which, when executed by a set of processors, cause said set of processors to perform the following:
   performing a first user authentication;
   selecting a remote server subsequent to said first authentication;
   sending a token to said remote server containing authentication information responsive to said first authentication and information regarding an account for the user including a new account for the user and wherein the information regarding an account for the user in said token includes a new user flag; and
   decoding said authentication information, wherein said decoding said authentication information induces a second user authentication.

* * * * *